US009633622B2

United States Patent
Kamhi et al.

(10) Patent No.: US 9,633,622 B2
(45) Date of Patent: Apr. 25, 2017

(54) MULTI-USER SENSOR-BASED INTERACTIONS

(71) Applicant: Intel Corporation, Santa Clara, CA (US)

(72) Inventors: Gila Kamhi, Zichron Yaakov (IL); Ron Ferens, Ramat Hasharon (IL); Vladimir Vova Cooperman, Haifa (IL); Kobi Nistel, Haifa (IL); Barak Hurwitz, Kibbutz Alonim (IL)

(73) Assignee: Intel Corporation, Santa Clara, CA (US)

( * ) Notice: Subject to any disclaimer, the term of this patent is extended or adjusted under 35 U.S.C. 154(b) by 144 days.

(21) Appl. No.: 14/575,797

(22) Filed: Dec. 18, 2014

(65) Prior Publication Data

US 2016/0180797 A1  Jun. 23, 2016

(51) Int. Cl.
| | |
|---|---|
| G06T 19/00 | (2011.01) |
| G09G 5/00 | (2006.01) |
| G06F 9/54 | (2006.01) |
| G06F 3/14 | (2006.01) |

(52) U.S. Cl.
CPC .............. G09G 5/003 (2013.01); G06F 3/14 (2013.01); G06F 9/542 (2013.01); G06T 19/006 (2013.01); G09G 2354/00 (2013.01); G09G 2358/00 (2013.01); G09G 2370/10 (2013.01)

(58) Field of Classification Search
None
See application file for complete search history.

(56) References Cited

U.S. PATENT DOCUMENTS

| | | | | |
|---|---|---|---|---|
| 2011/0305369 A1* | 12/2011 | Bentley | .............. | G06K 9/00342 382/103 |
| 2012/0025975 A1 | 2/2012 | Richey et al. | | |
| 2012/0219181 A1* | 8/2012 | Tseng | .................... | G06F 3/0486 382/103 |

(Continued)

FOREIGN PATENT DOCUMENTS

| | | |
|---|---|---|
| WO | WO-2012068256 A2 | 5/2012 |
| WO | WO-2016099933 A1 | 6/2016 |

OTHER PUBLICATIONS

Hoang, Thoung N, et al., "Augmented Viewport: Towards precise manipulation at a distance for outdoor augmented reality wearable computers", Recent Trends of Mobile Collaborative Augmented Reality Systems: Edited by Lelia Alem and Weidong Huang, Springer Science & Business Media, (2011), 53-66.

(Continued)

*Primary Examiner* — Jacinta M Crawford
*Assistant Examiner* — Diane Wills
(74) *Attorney, Agent, or Firm* — Schwegman Lundberg & Woessner, P.A.

(57) ABSTRACT

Disclosed in some examples are methods systems and machine readable mediums in which actions or states of a first user (e.g., natural interactions) having a first corresponding computing device are observed by a sensor on a second computing device corresponding to a second user. A notification describing the observed actions or states of a first user may be shared across a network with the first corresponding computing device. In this way, the first computing device may be provided with information concerning the state of the user without having to directly sense the user.

20 Claims, 7 Drawing Sheets

(56) References Cited

U.S. PATENT DOCUMENTS

| | | |
|---|---|---|
| 2013/0084970 A1 | 4/2013 | Geisner et al. |
| 2013/0298030 A1 | 11/2013 | Nahumi et al. |
| 2014/0253743 A1 | 9/2014 | Loxam et al. |
| 2015/0234477 A1* | 8/2015 | Abovitz ............. G06K 9/00671 382/103 |

OTHER PUBLICATIONS

Starner Thad, et al., "Augmented Reality through Wearable Computing", The Media Laboratory, Massachusetts Institute of Technology, [Online]. Retrieved from the Internet: <URL: http://www.cc.gatech.edu/~thad/p/journal/augmented-reality-through-wearable-computing.pdf >, ((last accessed Oct. 18, 2014)).
"International Application Serial No. PCT/US2015/063797, International Search Report mailed Mar. 23, 2016", 3 pgs.
"International Application Serial No. PCT/US2015/063797, Written Opinion mailed Mar. 23, 2016", 11 pgs.

\* cited by examiner

MULTI-USER SENSOR-BASED INTERACTIONS

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in the drawings that form a part of this document: Copyright 2014 Intel, Inc., All Rights Reserved.

TECHNICAL FIELD

Embodiments pertain to augmented reality systems. Some embodiments relate to gesture recognition, multi-device interaction and natural user interaction.

BACKGROUND

Computing devices have decreased in size over the last several years. These computing devices may even take the form of devices worn on a user's body. Even as computing devices have decreased in size, functionality has increased. For example, many computing devices have on-board sensors, such as cameras, motion sensors, and the like.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
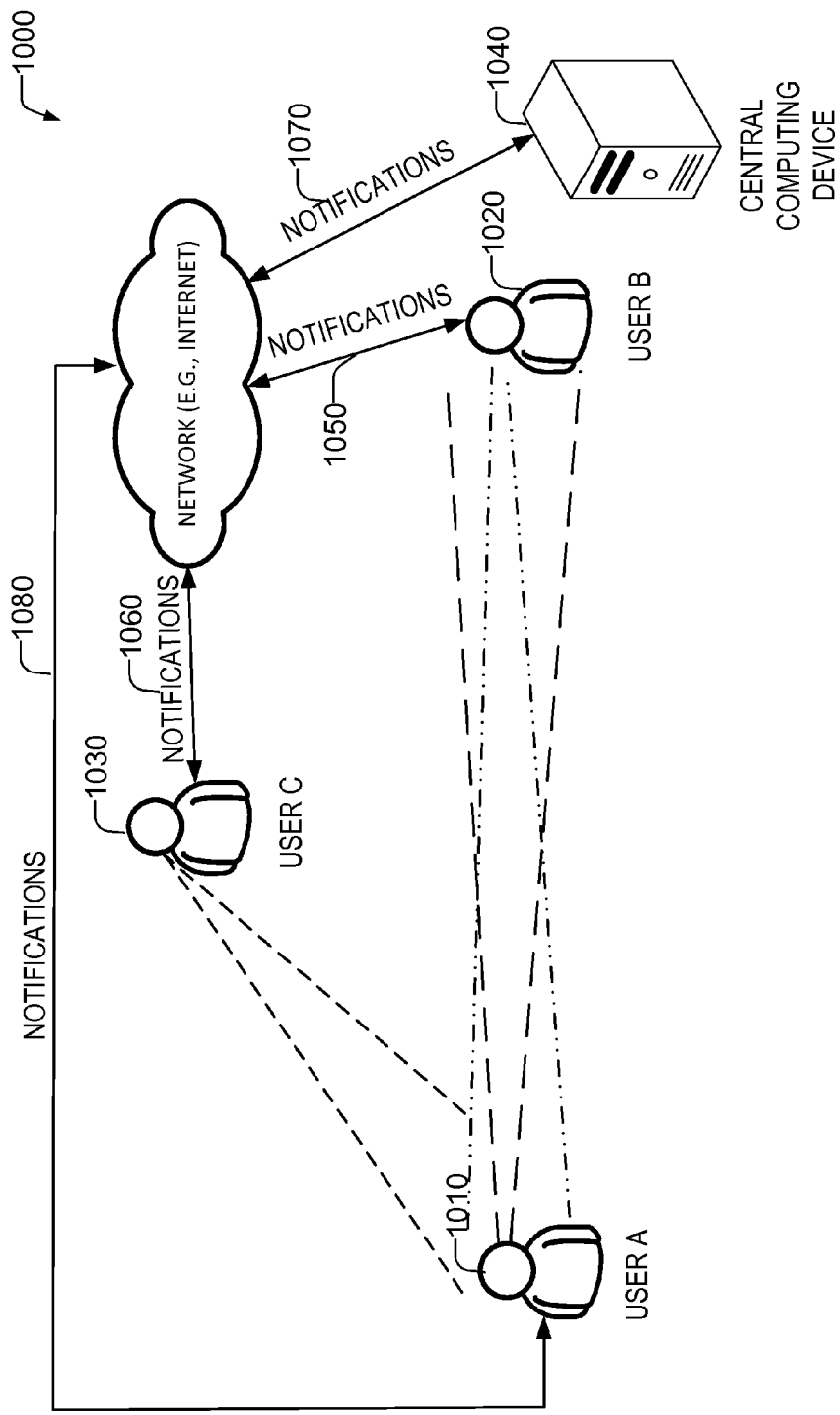
FIG. 1 shows an example of a multi-user, multi-device natural interaction sensor-based application environment.

As disclosed herein, computing applications may utilize sensor data which describes information about the real world, and in particular, about users in the real world to provide various sensor-based applications. In one example sensor-based application, natural interactions such as gestures and emotions of a first party may be detected and displayed to the first party to provide real-time analysis of how that party is being received by a second party. For example, an application may detect a speaker's gestures and emotions and display them to the speaker as they are speaking. Knowing how one's gestures are likely to be received by another party may improve relations between the parties to the conversation. A sensor-based application may be any application executable by a computing device which makes use of a sensor in the computing device to provide functionality to a user.

As another example of a sensor-based application, augmented reality applications blend the physical, real-world environment with inserted computer-generated objects and data, making the computer-generated objects appear to be part of the physical, real-world environment. The computer-generated objects may be manipulated by the participant users using natural gestures and interactions. The augmented reality may be provided by one or more computing devices which utilize one or more sensors in order to sense, measure, and detect items in the real world including users and their gestures and movements, and to add one or more computer generated objects which are visible on one or more output (e.g., display) devices. Example augmented reality applications include games which superimpose game objects in a real world environment. Players may interact with the game objects using natural physical gestures. For example, a user may pick up, move, delete, change, or otherwise interact with the objects similar as if they were real life objects. Other example applications may include navigation applications where a route indicator (e.g., a line) is superimposed upon a picture of the correct road to take.

Sensing devices for these applications may include global positioning sensors (GPS), accelerometers, image sensors (e.g., cameras) such as an Intel RealSense™ 3D camera, object scanners, and the like. Sensing devices may output data (called sensor data) such as GPS coordinates, image pixel data, acceleration quantities and directions, and the like. This data may be analyzed by the computing device to determine model data. The model data describes information (e.g., size, position, and other attributes) of at least a portion of the real world, including one or more objects in the real world. The model may be derived from the raw sensor data. Objects in the real world may include people in the real world. In some examples, the model may include detected actions of those objects. Actions may include any movements of objects such as gestures, hand and finger tracking, speech recognition, facial movements, and other aspects regarding people and other objects detected in the real world. Detecting of action information may include detecting natural interactions such as gestures, facial movements and the like. Action information may describe one or more detected actions. In some examples, the model may include one or more inferred states for the real world objects that are inferred from object actions. States that apply to persons may include happy, sad, bored, disinterested, and the like. For example, facial recognition and gesture recognition may infer states of individuals from facial actions such as facial expressions. States may be described by object state information. Software such as Intel RealSense™ software may be employed to do this analysis.

In order to make these applications more usable and enjoyable in everyday environments, the sensory devices (e.g., cameras) may be on wearable devices and other portable computing devices. However, wearable, and other portable computing devices may only have a camera facing outward, thus the sensors may not detect gestures, facial expressions, and other input regarding the user themselves. Positioning a camera facing inward to capture the facial expressions and gestures of the wearing user would increase the device's size and cost. Adding the camera facing inward would also be difficult to implement in many wearables as this would require placing the camera at a distance from the subject to achieve a satisfactory focal length and to capture enough of the user. Thus wearables have difficulty in sensing the gestures, hand and finger tracking, speech recognition, facial analysis, and other aspects of the user that is wearing it. While the forward facing camera can detect these aspects for other people, the ability of the wearable to facilitate the interaction of the user with the augmented reality environment is limited.

Disclosed in some examples are methods systems and machine readable mediums in which actions or states of a first user (e.g., natural interactions) having a first corresponding computing device are observed by a sensor on a second computing device corresponding to a second user. A notification describing the observed actions or states of a first user may be shared across a network with the first corresponding computing device. In this way, the first computing device may be provided with information concerning the state of the user without having to directly sense the user. In the same way, the first computing device may send information about the second user to the second computing device. This collaborative sharing of detected natural interactions may allow for expanded applications of sensor-based applications. For example, this collaborative sharing may allow the first and second user to see themselves through the other user's eyes. For example, the second computing device may relay detected gestures, emotions, and other observations about the first user to the first user's computing device for use on the first user's display device.

The information exchanged between the computing devices may be an exchange of notification data, which may include one or more of raw sensor data (which may then be used by the recipient to calculate model data—including objects, actions, and object states), model data, action information (e.g., information on gestures), or object state information. This notification data may be sent directly to other computing devices participating in the application, or may be sent to a central computing device. The central computing device may then forward the notification data to other computing devices participating in the application. The notifications may be sent over a computer network.

In some examples, one or more of: processing raw sensor data to form model data, detecting objects, detecting actions, or inferring states of the objects from those actions may be done on the computing devices of the participating users. In other examples, one or more of: processing raw sensor data to form model data, detecting objects, detecting actions, or inferring states of the objects from those actions may be done on the central computing device based upon notification data sent from the computing devices of the users participating in the application.

Notification data sent from the devices of the users to the central computing device may be different from the notification data disseminated from the central computing device to the devices of the users in response. For example, a computing device associated with a user of the application may send raw sensor data which may be processed into object state information by the central computing device, and the like. The object state information may then be sent to the individual computing devices instead of the raw sensor data.

As noted, actions or states of a first user (e.g., natural interactions) having a first corresponding computing device are observed by a sensor on a second computing device corresponding to a second user. The second computing device or the central computing device may associate the observed actions or states of the first user with the first user's computing device (and indeed the first user). In some examples, this may be done based upon facial or other object recognition techniques performed by either the second computing device or the central computing device. For example, each user may submit one or more registration images of themselves to the system, for example, to the central computing device. In some examples, this may happen during registration. One or more facial recognition algorithms may utilize the registration images to determine the user that corresponds to the action or state. These algorithms may be run on the computing devices or the central computing devices. In other examples, other ways of associating the first user with the particular action or state may include using locations (e.g., a location registry where user's locations are compared with locations of observed actions or states) wirelessly broadcast identifiers (e.g., the computing devices broadcast a unique identifier on a short range (less than 100 m) wireless link), or the like.

Computing devices may include wearable computing devices such as smart glasses, smart watches, and the like. Computing devices may also include tablet computers, laptop computers, desktop computers, and the like.

These systems, methods, and machine readable mediums may have a variety of uses. For example, feedback on how other users in the system see or perceive you can be displayed to you and used to improve social relations, understand conflicts, and improve your ability to persuade and influence stakeholders in a face-to-face meeting. Other uses include edutainment, gaming, dating, and the like.

FIG. 1 shows an example 1000 of a multi-user, multi-device natural interaction sensor-based application environment. In an example, the environment is a multi-user local environment whereby users are equipped with computing devices with outward (e.g., world) facing sensors (e.g., 2D or 3D cameras). In some examples, the computing device may comprise a wearable computing device (e.g., a smartwatch, a computing device embedded into eyeglasses, or the like). The computing devices may utilize the sensors to perceive information about the local environment within its range (e.g., for a camera sensor—within its field of view). In some examples, the computing devices may be equipped with instructions for processing the raw sensor data into model information, including in some examples one or more of: object detection and recognition, action detection, and object state determinations. For example, the computing devices may detect another user, actions taken by the user (e.g., a smile, a frown, and the like), and based upon those actions, the state of the user (e.g., happy, sad, engaged, inattentive, bored, and the like). For example, a user state may be detected in which a user rolled their eyes. This gesture may be translated into an emotion of annoyance. The computing device may have instructions which translate gestures into emotions.

In FIG. 1, User A 1010 is equipped with wearable computing device and is facing User B 1020. User B 1020 is also equipped with a wearable computing device and is facing User A 1010. User C 1030 is facing User A 1010 and is equipped with a computing device. In an example, User B's computing device may record video of User A. User A's actions (e.g., a gesture) may be detected by User B's computing device (and vice versa) through analysis of the raw sensor data. Notification information about User A 1010 (e.g., action information) may be sent to central computing device 1040 using notifications 1050. Central computing device 1040 may send the notification information 1070 on to one or more of computing devices of User A 1010, User B 1020, and User C 1030. The selection of which computing devices to share the notification information with may be determined by one or more of device subscriptions (e.g., devices subscribe to receive this information), privacy settings in the computing device, proximity, and the like. For example, notification information relating to users within a particular proximity to a particular computing device may be sent to the particular computing device. User C's computing device may also record sensor data of User A. User A's actions (e.g., a gesture) may be detected by User C's computing device (and vice versa) through analysis of the raw sensor data. Notification information about User A 1010 (e.g., action information) may be sent to central computing device 1040 using notifications 1060. Central computing device 1040 may send the notification information 1070 to one or more of computing devices of User A 1010, User B 1020, and User C 1030. User A's computing device may also record sensor data of User B. User B's actions (e.g., a gesture) may be detected by User A's computing device (and vice versa) through analysis of the raw sensor data. Notification information about User B 1020 (e.g., action information) may be sent to central computing device 1040 using notifications 1080. Central computing device 1040 may send the notification information 1070 to one or more of computing devices of User A 1010, User B 1020, and User C 1030. As already noted, notification information 1070 may be the same information as sent in notification information 1050, 1060, and 1080, or may be different notification information which is based upon the notification information in 1050, 1060, and 1080. Thus, despite each computing device having only a limited field of view of users in the application, through collaborative sharing of information, each computing device may obtain information regarding all users in the application.

Figure 2:
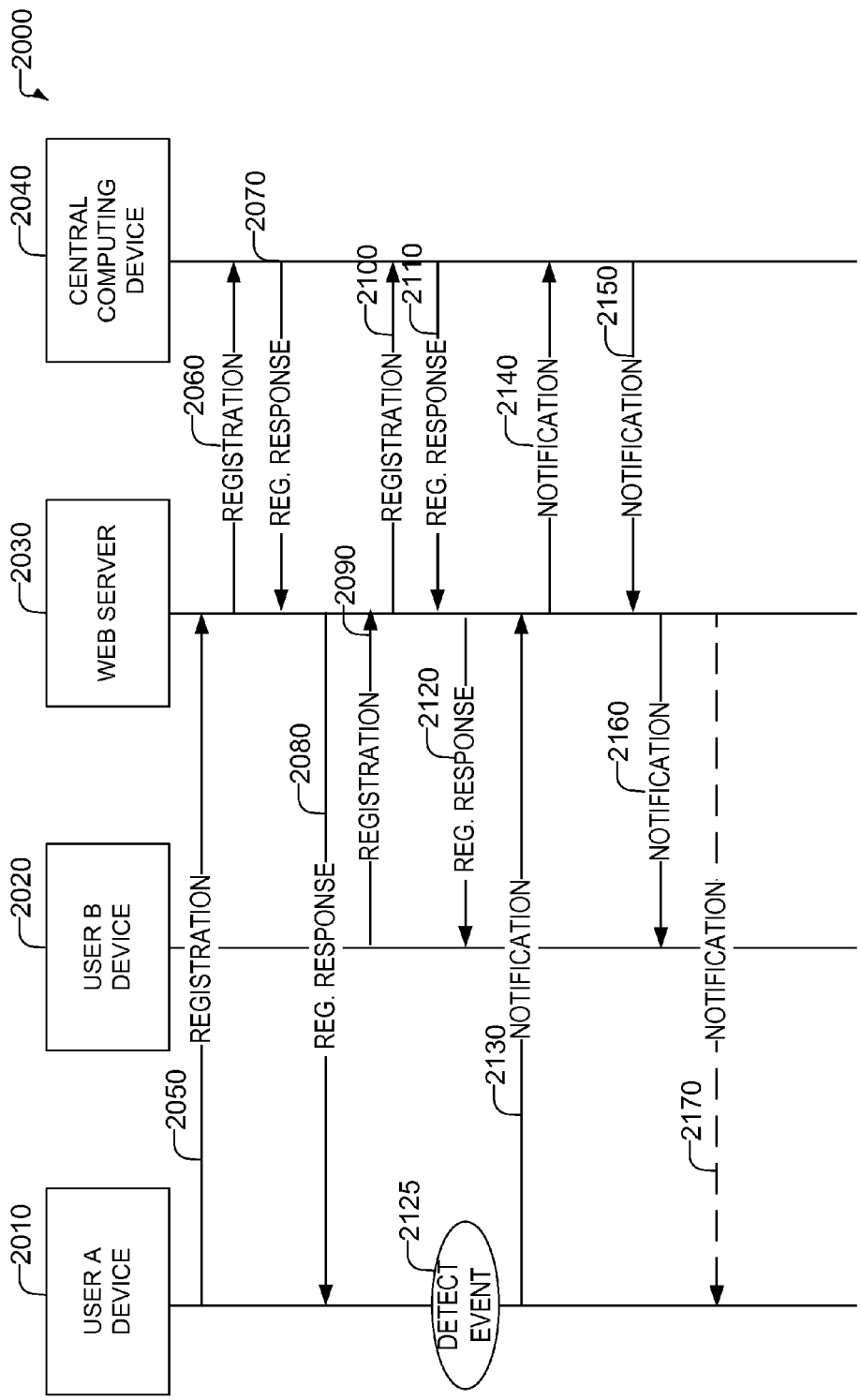
FIG. 2 shows a message sequence chart of a collaborative multi-user natural interaction service using a central computing device according to some examples of the present disclosure.

FIG. 2 shows a message sequence chart 2000 of a collaborative multi-user natural interaction service using a central computing device (e.g., such as a web server) according to some examples of the present disclosure. Computing device of User A 2010 may register with a web server 2030 using a registration request message 2050. This registration may specify notification information that device 2010 is interested in receiving. The registration message 2050 may specify notification information at a high level or a granular level. For example, the registration information may request all information associated with all devices participating in a particular application, or an instance of an application; all information for a particular user of the application; only certain sensor information, model information, action information, or state information (e.g., only show me when a particular user is sad); or the like. Web server 2030 may process the request 2050 and forward it on to the central computing device 2040 (represented by message 2060). The registration 2060 may be recorded on a data store associated with the central computing device 2040 and a response 2070 may be sent. Web server 2030 may then respond with a registration response 2080. The process may be repeated for User B device 2020 with messages 2090, 2100, 2110, and 2120. In some examples, web server 2030 may be part of central computing device 2040.

At operation 2125 the computing device of User A 2010 may detect an event corresponding to another user (e.g., User B). Events may be any change in the model, for example, a detected action, a change in state of one or more objects or users, and the like. An event may also include expiration of a timer—e.g., the computing device may regularly send updates including notification information to the central computing device 2040 (e.g., the central computing device). In some examples, notification information may describe the event, or may describe the current model of the computing device. Notification 2130 may be sent to the web server 2030, which may forward it 2140 to the central computing device 2040. Central computing device 2040 may forward the notification back to web server in message 2150 for distribution to one or more selected computing devices based upon the subscription information. In some examples, central computing device 2040 may process the received notifications 2140. For example, if the notification is raw sensor data, the central computing device 2040 may use that data (and in some examples, raw sensor data from other devices that were received previously) to build a model, detect objects, detect actions, infer states, and the like. In these examples, the information in notifications 2130 and 2140 may be different than the information in the notification 2150 sent from the central computing device 2040 in that it may be processed. Web server 2030 may forward the notification 2150 to User B's computing device 2020 using message 2160, and in some examples to User A's computing device 2010 using message 2170. While FIG. 2 showed an example implementation with point to point messaging 2160 and 2170, in other examples, multi-cast or broadcast messaging may be employed.

Figure 3:
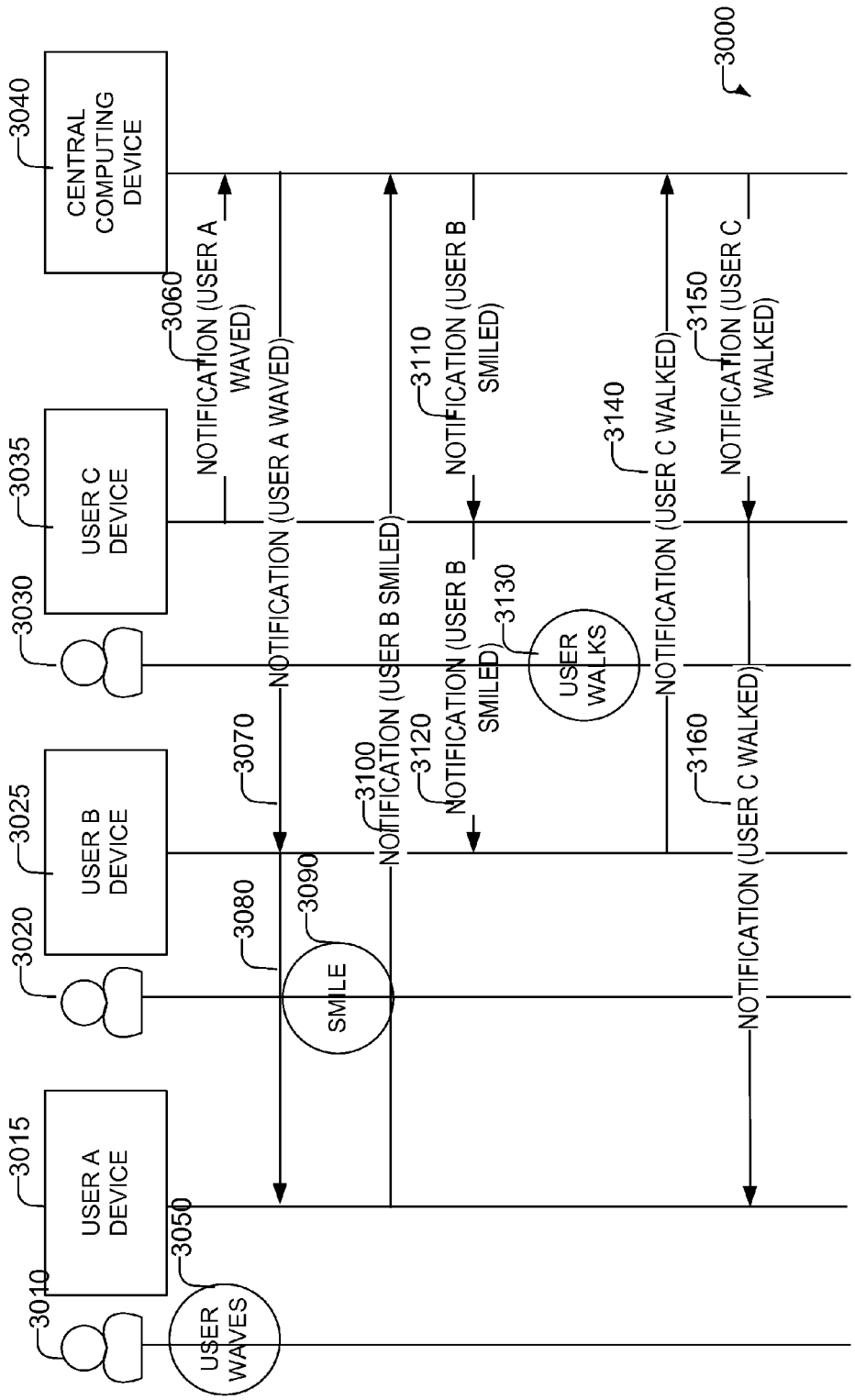
FIG. 3 shows a message sequence chart of a collaborative, multi-user natural interaction service using a central computing device according to some examples of the present disclosure.

FIG. 3 shows an example message sequence chart 3000 of a collaborative, multi-user natural interaction service using a central computing device according to some examples of the present disclosure. In the example shown in FIG. 3, User C 3030 is facing User A 3010, User A 3010 waves 3050 and that event is detected by User C's computing device 3035. User C's computing device 3035 may send a notification message 3060 (in this case, action information) to the central computing device 3040 indicating that User A waved. Central computing device 3040 may then send a notification message 3070 to User B's computing device 3025, and in some examples the collaborative multi user service 3040 may send a notification 3080 to User A's computing device 3015. These notification messages 3070 and 3080 may indicate that User A 3010 waved. This indication may allow the computing devices 3015 and 3025 to update an application which may display this indication or otherwise provide digital content based upon this indication. In other examples messages 3080 and 3070 may be messages which update one or more states of one or more virtual objects in an application executing on the devices 3015, 3025, and 3035 based upon the notification 3060. For example, if the application is an augmented reality game, and the wave gesture is used to cast a magic spell, the messages 3080 and 3070 may be used to update the display of the augmented reality to reflect the cast spell. In these examples, messages may also be sent to User C's computing device 3035.

Continuing on FIG. 3, User B 3020 may smile 3090. User A's computing device 3015 may detect the smile and send a notification message 3100 to the central computing device 3040. Central computing device 3040 may send a notification 3110 indicating that User B has smiled to User C's device 3035, and in some examples a notification 3120 to User B's computing device (and in even further examples an indication to User A's computing device 3015). As already noted, this may be an indication that the User B smiled (or some other user state indication), or may be an update to one or more virtual objects. Similarly, when User C walks 3130, it may be detected by User B's computing device 3025. User B's computing device 3025 may send a notification 3140 to the central computing device 3040, which may then send notifications 3150 and 3160 to User A's computing device and User C's computing device.

Figure 4:
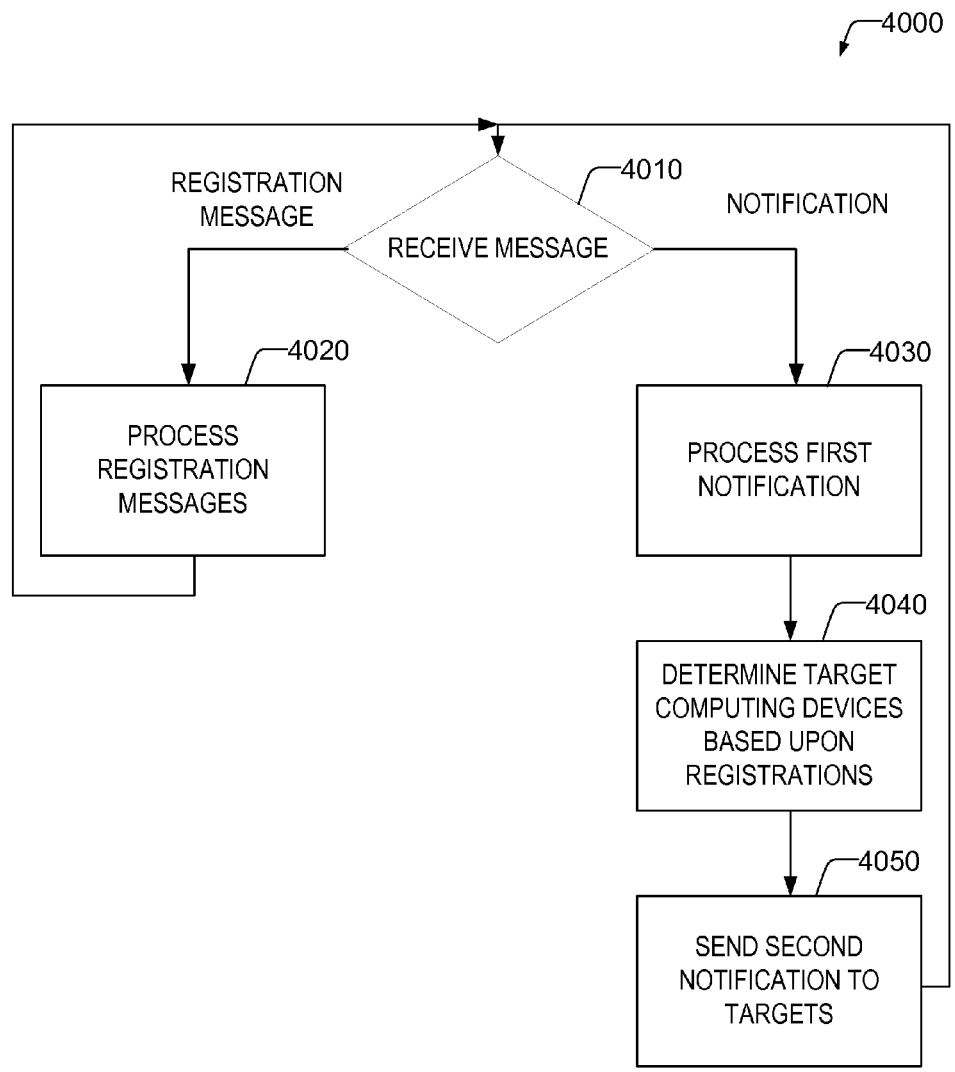
FIG. 4 shows a flowchart of a method of a central computing device facilitating sharing of information in a sensor based application according to some examples of the present disclosure.

Turning now to FIG. 4, a flowchart of a method 4000 of a central computing device facilitating sharing of information in a sensor based application according to some examples of the present disclosure. At operation 4010 the central computing device may receive a message. If the message is a registration message, the central computing device may process the registration message at operation 4020. Processing the registration message may include storing registration details in local storage. Registration messages may register a computing device with a particular application. In some examples, registration messages may register the computing device at a particular location in examples in which notifications are sent based upon proximity to the particular user for which the notification was sent. In these examples, the registration messages may be sent periodically by the computing devices to update the location of the computing devices with the central computing device.

If the message received at operation 4010 is a notification message, the notification message may be processed at operation 4030. In some examples, processing the notification may include calculating model information, including actions, states, and the like based upon the information included in the notification. At operation 4040, the computing devices (target devices) which will receive the second notification from the central computing device may be determined. This may be based upon the registration information. At operation 4050, the second notification may be sent to the target computing devices. The first and second notifications may comprise the same information (e.g., raw sensor data, action information, state information, model information, and the like). In other examples, the second notification may comprise information calculated based upon the first notification—e.g., model data calculated from raw sensor data in the first notification (e.g., calculated at operation 4030).

Figure 5:
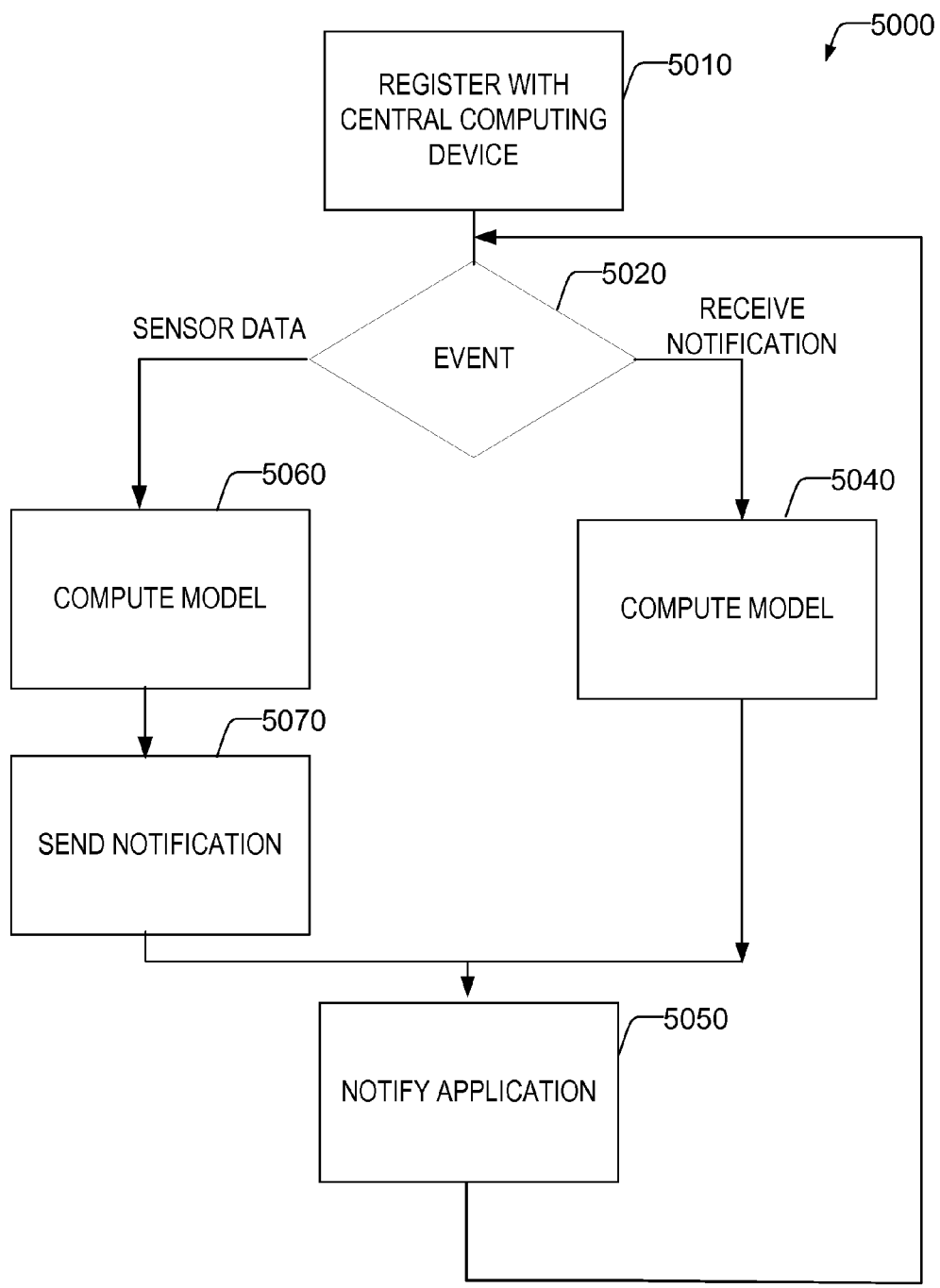
FIG. 5 shows a flowchart of a method of a computing device providing information about the user to a sensor-based application according to some examples of the present disclosure is shown.

Turning now to FIG. 5, a method 5000 of a computing device providing information about the user to a sensor-based application according to some examples of the present disclosure is shown. At operation 5010 the computing device registers with the central computing device. At operation 5020 the computing device receives an event. Events may include notifications or sensor data. If the event is a notification (e.g., received from another computing device or the central computing device), the computing device may read the notification and, if necessary, compute or update the computing device's model at 5040. E.g., if the notification is raw sensor data, the computing device may detect one or more: one or more objects, one or more actions, and/or one or more states of the detected objects. In other examples, if the notifications include model information, the model information in the notification may be used to update the model information in the computing device. At operation 5050, in some examples, the notification information and/or updated model may be utilized to notify the application. For example, the computing device may send a notification to the sensor-based application. In some examples, the operations of FIG. 5 may be performed by the sensor-based application itself. In these examples, the notification may be a function call, a procedure call, a flag, intra process communications, inter-process communications, or the like. The application may utilize the information to update the application state. Updates may include, for example, updating a display of the application. As an example, if the notification information is information about the perceived state of the user of the sensor-based application (e.g., a perceived emotion) as perceived by another computing device, the sensor-based application may display that state to the user.

If the received event at operation 5020 is sensor data (or in some examples, a scheduled sensor reading), the computing device may compute or update the model 5060. For example, the computing device may calculate an action, states (e.g., emotions), or other model information from the sensor data. At operation 5070 the computing device may send the sensor data or model information (including action, emotions, and the like) to the central computing device. At operation 5050 the computing device may notify the sensor-based application 5050 based upon the sensor data.

Figure 6:
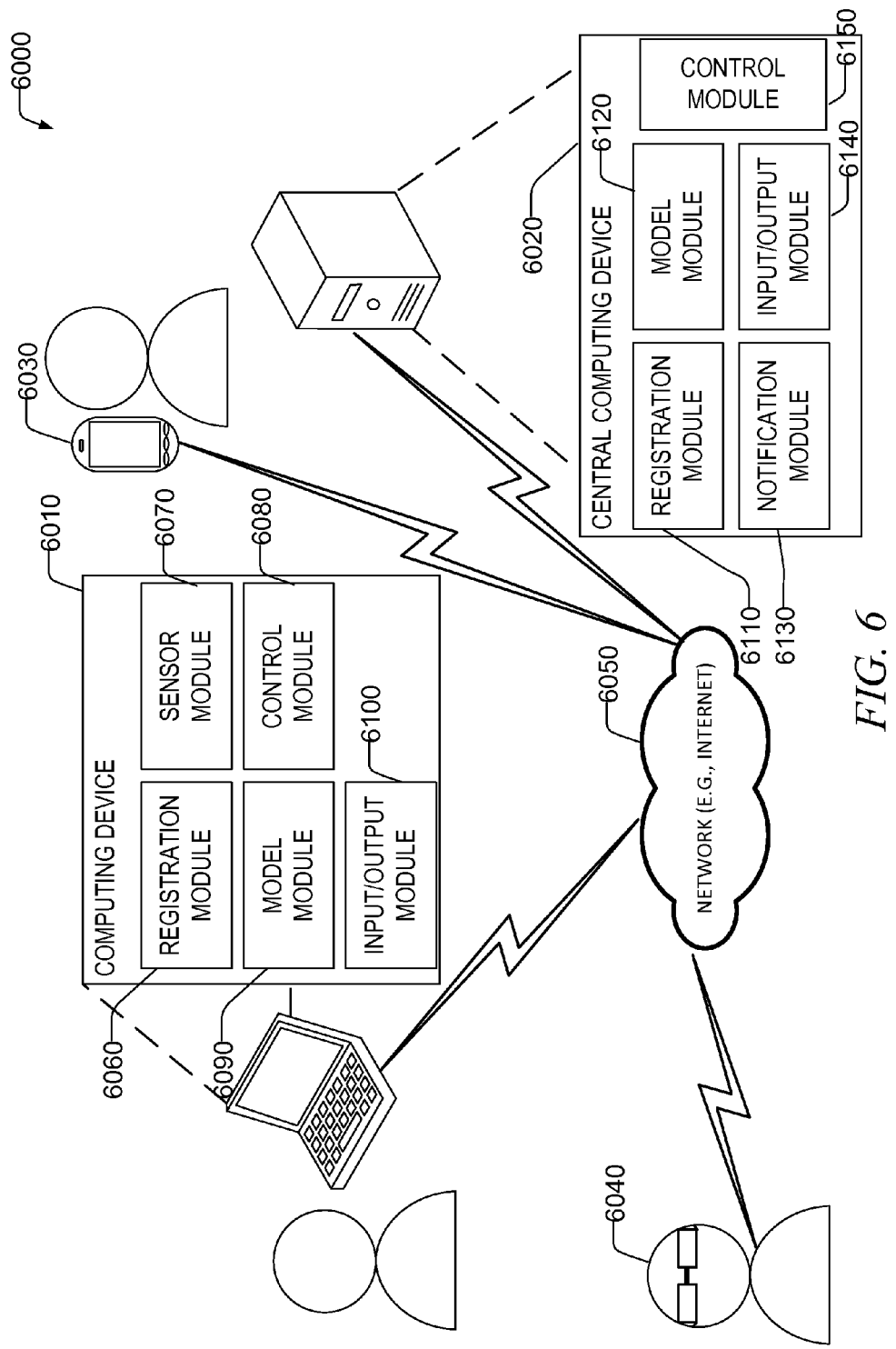
FIG. 6 shows a schematic of a system for providing information to a collaborative multi-user natural interaction sensor-based application according to some examples of the present disclosure

FIG. 6 shows a schematic of a system for providing information to a collaborative multi-user natural interaction sensor-based application 6000 according to some examples of the present disclosure, including logical diagrams of a computing device 6010 and a central computing device 6020. Computing devices such as laptop 6010, mobile device 6030, and wearable 6040 (shown as wearable computing glasses) may participate in augmented reality applications and may communicate with each other through central computing device 6020 over network 6050. Computing devices may include a variety of logical modules which may implement one or more of the methods of FIG. 4 and message sequence charts from FIGS. 2-3. The methods of FIG. 4 may be performed by one or more of the modules shown for computing device 6010 of FIG. 6.

Registration module 6060 may register with central computing device 6020. As already noted, it may register to receive notifications associated with a particular application. In some examples the registration module may send registration messages to central computing device 6020 to update central computing device 6020 on the location of the computing device 6010. Registration module 6060 may send registration messages to central computing device 6020 through input and output module 6100. Input and output module 6100 may implement one or more communication protocols to communicate across network 6050 with one or more other computing devices and central computing device 6020. Input and output module 6100 may also output a display and other interfaces to the user of the computing device 6010.

Sensor module 6070 may be one or more sensors such as a 3D camera which may be forward facing and which may capture data about the real world. Sensor module 6070 may provide this data to model module 6090. Model module 6090 may analyze the sensor data to identify objects in the real world, determine actions that those objects take, and based on those actions, to determine states of those objects (e.g., emotions). In some examples, computing device 6010 may not have the processing power or battery life to calculate model information from the sensor data, or it may be desirable to limit the amount of processing power used to calculate model information. In these examples, computing device 6010 may send raw sensor data or partial calculations to the central computing device 6020. Model module 6120 of the central computing device 6020 may then use the raw sensor data or partial calculations to calculate the model information. The completed calculations may then be sent back to computing device 6010. Control module 6080 may utilize the data determined about the user of the computing device in a sensor-based application coupled to the computing device. For example, control module 6080 may communicate this data to the sensor-based application, or may provide a way for the sensor-based application to obtain this information (e.g., providing an application programming interface API). In other examples, control module 6080 may provide the sensor-based application, such as augmented reality applications and may coordinate the actions of the other modules. Control module 6080 may send a notification to central computing device 6020 based upon the sensor data. For example the control module 6080 may send a notification when the model changes, or when the model changes in a predetermined fashion (e.g., a state of an object changes, an action is detected, or the like.)

Central computing device 6020 may include a variety of logical modules which may implement one or more of the methods of FIG. 5 and message sequence charts from FIGS. 2-3. The methods of FIG. 5 may be performed by one or more of the modules shown for central computing device 6020 of FIG. 6. For example, central computing device 6020 may include registration module 6110 which may process registrations and/or updates to a location of computing device 6010. Model module 6120 may utilize notifications received from other computing devices through notification module 6130 to update or create a model stored by central computing device 6020. For example, model module 6120 may analyze the information in the notifications to identify objects in the real world, determine actions that those objects take, and based on those actions, to determine states of those objects (e.g., emotions). Notification module 6130 may determine which computing devices to send notifications to as a result of receiving a notification. As already noted, the notifications sent from the notification module 6130 may comprise the same or different information as what is received from the computing devices. Notification module 6130 may also receive and process notifications from computing devices. Input and output module 6140 may implement one or more communication protocols to communicate across network 6050 with one or more other computing devices. Control module 6150 may coordinate the activities of the registration module 6110, model module 6120, notification module 6130, and input and output module 6140. Control module 6150 may also provide or facilitate one or more centrally managed sensor applications. For example, an augmented reality game. In these examples, the notifications sent from computing devices 6010 may update one or more states of these applications. Updates to applications may then be sent in notification messages to computing devices 6010.

Figure 7:
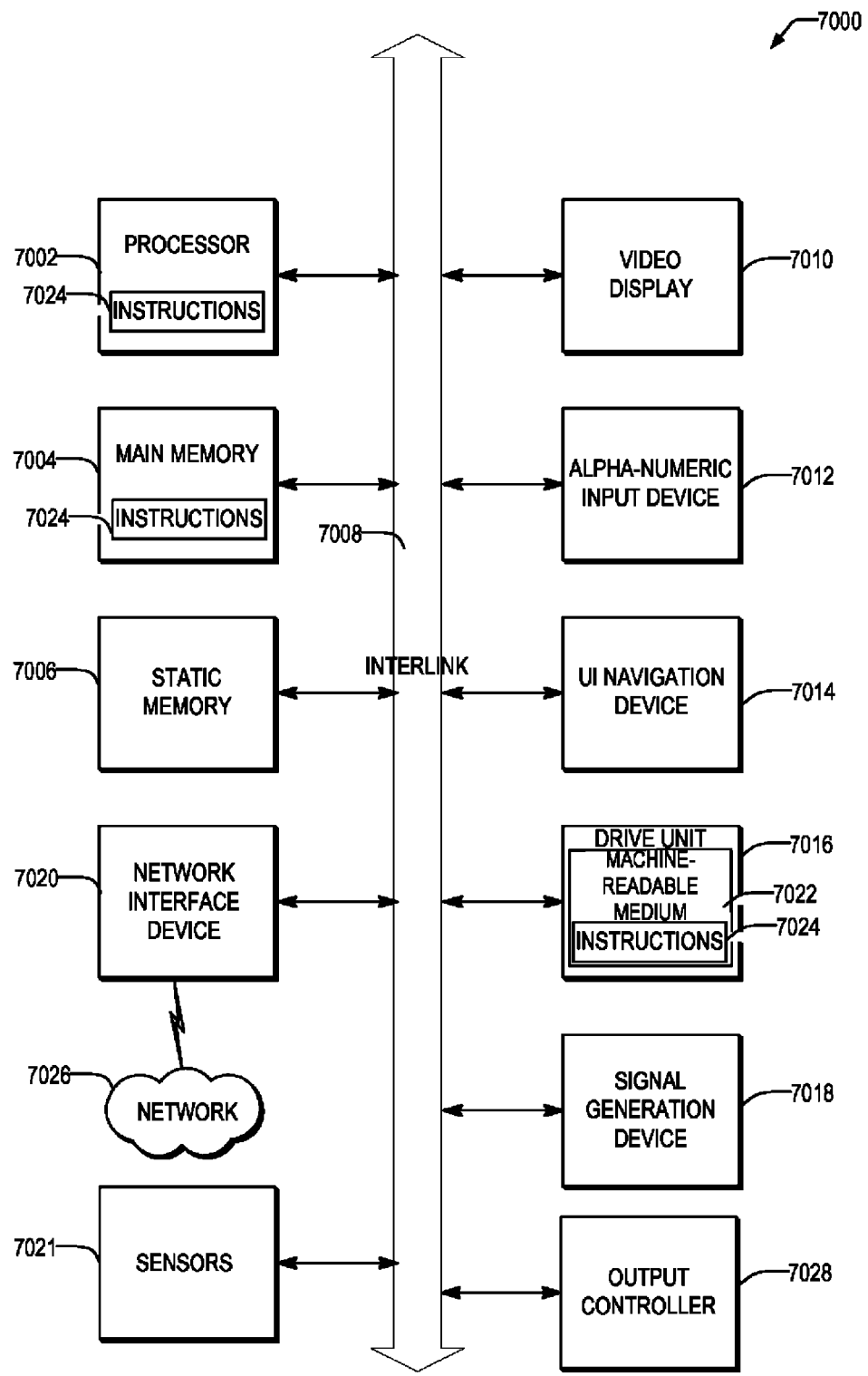
FIG. 7 is a block diagram illustrating an example of a machine upon which one or more embodiments may be implemented.

FIG. 7 illustrates a block diagram of an example machine 7000 upon which any one or more of the techniques (e.g., methodologies) discussed herein may perform. In alternative embodiments, the machine 7000 may operate as a stand-alone device or may be connected (e.g., networked) to other machines. In a networked deployment, the machine 7000 may operate in the capacity of a server machine, a client machine, or both in server-client network environments. In an example, the machine 7000 may act as a peer machine in peer-to-peer (P2P) (or other distributed) network environment. The machine 7000 may be a computing device, a central computing device, and the like in the form of a personal computer (PC), a tablet PC, a wearable computing device, a set-top box (STB), a personal digital assistant (PDA), a mobile telephone, a smart phone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

Machine (e.g., computer system) 7000 may include a hardware processor 7002 (e.g., a central processing unit (CPU), a graphics processing unit (GPU), a hardware processor core, or any combination thereof), a main memory 7004 and a static memory 7006, some or all of which may communicate with each other via an interlink (e.g., bus) 7008. The machine 7000 may further include a display unit 7010, an alphanumeric input device 7012 (e.g., a keyboard), and a user interface (UI) navigation device 7014 (e.g., a mouse). In an example, the display unit 7010, input device 7012 and UI navigation device 7014 may be a touch screen display. The machine 7000 may additionally include a storage device (e.g., drive unit) 7016, a signal generation device 7018 (e.g., a speaker), a network interface device 7020, and one or more sensors 7021, such as a global positioning system (GPS) sensor, compass, accelerometer, or other sensor. The machine 7000 may include an output controller 7028, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 7016 may include a machine readable medium 7022 on which is stored one or more sets of data structures or instructions 7024 (e.g., software) embodying or utilized by any one or more of the techniques or functions described herein. The instructions 7024 may also reside, completely or at least partially, within the main memory 7004, within static memory 7006, or within the hardware processor 7002 during execution thereof by the machine 7000. In an example, one or any combination of the hardware processor 7002, the main memory 7004, the static memory 7006, or the storage device 7016 may constitute machine readable media.

While the machine readable medium 7022 is illustrated as a single medium, the term "machine readable medium" may include a single medium or multiple media (e.g., a centralized or distributed database, and/or associated caches and servers) configured to store the one or more instructions 7024.

The term "machine readable medium" may include any medium that is capable of storing, encoding, or carrying instructions for execution by the machine 7000 and that cause the machine 7000 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); Solid State Drives (SSD); and CD-ROM and DVD-ROM disks. In some examples, machine readable media may include non-transitory machine readable media. In some examples, machine readable media may include machine readable media that is not a transitory propagating signal.

The instructions 7024 may further be transmitted or received over a communications network 7026 using a transmission medium via the network interface device 7020. The Machine 7000 may communicate with one or more other machines utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, among others. In an example, the network interface device 7020 may include one or more physical jacks (e.g., Ethernet, coaxial, or phone jacks) or one or more antennas to connect to the communications network 7026. In an example, the network interface device 7020 may include a plurality of antennas to wirelessly communicate using at least one of single-input multiple-output (SIMO), multiple-input multiple-output (MIMO), or multiple-input single-output (MISO) techniques. In some examples, the network interface device 7020 may wirelessly communicate using Multiple User MIMO techniques.

Other Notes and Examples

Example 1 includes subject matter (such as a device, apparatus, or machine) comprising: one or more computer processors configured to include: a notification module to: receive, over a computer network, a first notification from a first computing device, the first notification including data determined from a sensor on the first computing device, the data determined from the sensor indicating information determined about a user associated with a second computing device; a control module to: confirm that the second computing device is registered with an augmented reality application; and send a second notification to the second computing device in response to confirming that the second computing device is registered, wherein the second notification is based upon the first notification.

In Example 2, the subject matter of Example 1 may include, wherein the first notification comprises raw sensor data, and wherein the second notification comprises the raw sensor data.

In Example 3, the subject matter of any one of Examples 1 to 2 may include, wherein the first notification comprises raw sensor data, and wherein the control module is further configured to determine model data about the user from the raw sensor data and wherein the second notification includes the model data.

In Example 4, the subject matter of any one of Examples 1 to 3 may include, wherein the model data is action information describing an action of the user.

In Example 5, the subject matter of any one of Examples 1 to 4 may include, wherein the model data is state information describing a state of the user.

In Example 6, the subject matter of any one of Examples 1 to 5 may include, wherein the first notification comprises model data corresponding to the user and wherein the second notification comprises the model data.

In Example 7, the subject matter of any one of Examples 1 to 6 may include, wherein the first notification comprises object state information describing a state of the first user and wherein the second notification comprises object state information.

In Example 8, the subject matter of any one of Examples 1 to 7 may include, wherein the first notification comprises action information describing an action of the user and wherein the second notification comprises action information.

In Example 9, the subject matter of any one of Examples 1 to 8 may include, wherein the augmented reality application is a game.

In Example 10, the subject matter of any one of Examples 1 to 9 may include, wherein the augmented reality application is an application which displays a state of the user to the user, the state detected by the second computing device.

Example 11 includes subject matter (such as a method, means for performing acts, machine readable medium including instructions that when performed by a machine cause the machine to performs acts, or an apparatus to perform) comprising: at a central computing device, using one or more processors: receiving, over a computer network, a first notification from a first computing device, the first notification including data determined from a sensor on the first computing device, the data determined from the sensor indicating information about a user associated with a second computing device; confirming that the second computing device is registered with an augmented reality application; and responsive to confirming that the second computing device is registered to the augmented reality application, sending a second notification to the second computing device, wherein the second notification is based upon the first notification.

In Example 12, the subject matter of Example 11 may include, wherein the first notification comprises raw sensor data, and wherein the second notification comprises the raw sensor data.

In Example 13, the subject matter of any one of Examples 11 to 12 may include, wherein the first notification comprises raw sensor data, and wherein the method comprises determining model data about the user from the raw sensor data and wherein the second notification includes the model data.

In Example 14, the subject matter of any one of Examples 11 to 13 may include, wherein the model data is action information describing an action of the user.

In Example 15, the subject matter of any one of Examples 11 to 14 may include, wherein the model data is state information describing a state of the user.

In Example 16, the subject matter of any one of Examples 11 to 15 may include, wherein the first notification comprises model data corresponding to the user and wherein the second notification comprises the model data.

In Example 17, the subject matter of any one of Examples 11 to 16 may include, wherein the first notification comprises object state information describing a state of the first user and wherein the second notification comprises object state information.

In Example 18, the subject matter of any one of Examples 11 to 17 may include, wherein the first notification comprises action information describing an action of the user and wherein the second notification comprises action information.

In Example 19, the subject matter of any one of Examples 11 to 18 may include, wherein the augmented reality application is a game.

In Example 20, the subject matter of any one of Examples 11 to 19 may include, wherein the augmented reality application is an application which displays a state of the user to the user, the state detected by the second computing device.

Example 21 includes at least one machine-readable medium including instructions, which when executed by a machine, cause the machine to perform operations of any of the Examples 11-20.

Example 22 includes an apparatus comprising means for performing any of the Examples 11-20.

Example 23 includes subject matter (such as a device, apparatus, or machine) comprising: means for receiving, over a computer network, a first notification from a first computing device, the first notification including data determined from a sensor on the first computing device, the data determined from the sensor indicating information about a user associated with a second computing device; means for confirming that the second computing device is registered with an augmented reality application; and means for sending a second notification to the second computing device responsive to confirming that the second computing device is registered to the augmented reality application, wherein the second notification is based upon the first notification.

In Example 24, the subject matter of Example 23 may include, wherein the first notification comprises raw sensor data, and wherein the second notification comprises the raw sensor data.

In Example 25, the subject matter of any one of Examples 23 to 24 may include, wherein the first notification comprises raw sensor data, and wherein the central computing device comprises means for determining model data about the user from the raw sensor data and wherein the second notification includes the model data.

In Example 26, the subject matter of any one of Examples 23 to 25 may include, wherein the model data is action information describing an action of the user.

In Example 27, the subject matter of any one of Examples 23 to 26 may include, wherein the model data is state information describing a state of the user.

In Example 28, the subject matter of any one of Examples 23 to 27 may include, wherein the first notification comprises model data corresponding to the user and wherein the second notification comprises the model data.

In Example 29, the subject matter of any one of Examples 23 to 28 may include, wherein the first notification comprises object state information describing a state of the first user and wherein the second notification comprises object state information.

In Example 30, the subject matter of any one of Examples 23 to 29 may include, wherein the first notification comprises action information describing an action of the user and wherein the second notification comprises action information.

In Example 31, the subject matter of any one of Examples 23 to 30 may include, wherein the augmented reality application is a game.

In Example 32, the subject matter of any one of Examples 23 to 31 may include, wherein the augmented reality application is an application which comprises means for displays a state of the user to the user, the state detected by the second computing device.

Example 33 includes subject matter (such as a device, apparatus, or machine) comprising: one or more computer processors configured to include: a registration module to: send a registration message to a central computing device, the registration message registering the first computing device with the central computing device; a notification module to: receive a notification from the central computing device, wherein the notification comprises data determined about a user of the computing device from a forward-facing sensor on a second computing device; and a control module to: utilize the data determined about the user of the computing device in a sensor-based application coupled to the computing device.

In Example 34, the subject matter of Example 33 may include, wherein the notification comprises raw sensor data.

In Example 35, the subject matter of any one of Examples 33 to 34 may include, wherein the notification comprises model data.

In Example 36, the subject matter of any one of Examples 33 to 35 may include, wherein the model data is state information describing a state of the first user.

In Example 37, the subject matter of any one of Examples 33 to 36 may include, wherein the model data is action information describing an action of the user.

In Example 38, the subject matter of any one of Examples 33 to 37 may include, wherein the sensor-based application is a game, and wherein the first and second notifications are inputs that act on an object from the game.

Example 39 includes subject matter (such as a method, means for performing acts, machine readable medium including instructions that when performed by a machine cause the machine to performs acts, or an apparatus to perform) comprising: at a first computing device associated with a user, using one or more processors: sending a registration message to a central computing device, the registration message registering the first computing device with the central computing device; receiving a notification from the central computing device, wherein the notification comprises data determined about the user from a forward-facing sensor on a second computing device; and utilizing the data determined about the user of the computing device in a sensor-based application coupled to the computing device.

In Example 40, the subject matter of Example 39 may include, wherein the notification comprises raw sensor data.

In Example 41, the subject matter of any one of Examples 39 to 40 may include, wherein the notification comprises model data.

In Example 42, the subject matter of any one of Examples 39 to 41 may include, wherein the model data is state information describing a state of the first user.

In Example 43, the subject matter of any one of Examples 39 to 42 may include, wherein the model data is action information describing an action of the user.

In Example 44, the subject matter of any one of Examples 39 to 43 may include, wherein the sensor-based application is a game, and wherein the first and second notifications are inputs that act on an object from the game.

Example 45 includes at least one machine-readable medium including instructions, which when executed by a machine, cause the machine to perform operations of any of the Examples 39-44.

Example 46 includes an apparatus comprising means for performing any of the Examples 39-44.

Example 47 includes subject matter (such as a device, apparatus, or machine) comprising: means for sending a registration message to a central computing device, the registration message registering the first computing device with the central computing device; means for receiving a notification from the central computing device, wherein the notification comprises data determined about a user associated with the computing device from a forward-facing sensor on a second computing device; and means for utilizing the data determined about the user of the computing device in a sensor-based application coupled to the computing device.

In Example 48, the subject matter of Example 47 may include, wherein the notification comprises raw sensor data.

In Example 49, the subject matter of any one of Examples 47 to 48 may include, wherein the notification comprises model data.

In Example 50, the subject matter of any one of Examples 47 to 49 may include, wherein the model data is state information describing a state of the first user.

In Example 51, the subject matter of any one of Examples 47 to 50 may include, wherein the model data is action information describing an action of the user.

In Example 52, the subject matter of any one of Examples 47 to 51 may include, wherein the sensor-based application is a game, and wherein the first and second notifications are inputs that act on an object from the game.

Example 53 includes subject matter (such as a device, apparatus, or machine) comprising: one or more computer processors configured to include: a registration module to: send a registration message to a central computing device, the registration message registering the first computing device with the central computing device; a notification module to: send a notification to the central computing device, wherein the notification comprises data determined about a user of a second computing device from a forward-facing sensor on the computing device; and a control module to: utilize the data determined about the user of the second computing device in a sensor-based application coupled to the computing device.

In Example 54, the subject matter of Example 53 may include, wherein the notification comprises raw sensor data.

In Example 55, the subject matter of any one of Examples 53 to 54 may include, wherein the notification comprises model data.

In Example 56, the subject matter of any one of Examples 53 to 55 may include, wherein the model data is state information describing a state of the first user.

In Example 57, the subject matter of any one of Examples 53 to 56 may include, wherein the model data is action information describing an action of the user.

In Example 58, the subject matter of any one of Examples 53 to 57 may include, wherein the sensor-based application is a game, and wherein the first and second notifications are inputs that act on an object from the game.

Example 59 includes subject matter (such as a method, means for performing acts, machine readable medium including instructions that when performed by a machine cause the machine to performs acts, or an apparatus to perform) comprising: at a first computing device associated with a user, using one or more processors: sending a registration message to a central computing device, the registration message registering the first computing device with the central computing device; sending a notification to the central computing device, wherein the notification comprises data determined about a user of a second computing device from a forward-facing sensor on the computing device; and utilizing the data determined about the user of the second computing device in a sensor-based application coupled to the computing device.

In Example 60, the subject matter of Example 59 may include, wherein the notification comprises raw sensor data.

In Example 61, the subject matter of any one of Examples 59 to 60 may include, wherein the notification comprises model data.

In Example 62, the subject matter of any one of Examples 59 to 61 may include, wherein the model data is state information describing a state of the first user.

In Example 63, the subject matter of any one of Examples 59 to 62 may include, wherein the model data is action information describing an action of the user.

In Example 64, the subject matter of any one of Examples 59 to 63 may include, wherein the sensor-based application is a game, and wherein the first and second notifications are inputs that act on an object from the game.

Example 65 includes at least one machine-readable medium including instructions, which when executed by a machine, cause the machine to perform operations of any of the Examples 59-64.

Example 59 includes subject matter (such as a device, apparatus, or machine) comprising: means for sending a registration message to a central computing device, the registration message registering the first computing device with the central computing device; means for sending a notification to the central computing device, wherein the notification comprises data determined about a user of a second computing device from a forward-facing sensor on the computing device; and means for utilizing the data determined about the user of the second computing device in a sensor-based application coupled to the computing device.

In Example 60, the subject matter of Example 59 may include, wherein the notification comprises raw sensor data.

In Example 61, the subject matter of any one of Examples 59 to 60 may include, wherein the notification comprises model data.

In Example 62, the subject matter of any one of Examples 59 to 61 may include, wherein the model data is state information describing a state of the first user.

In Example 63, the subject matter of any one of Examples 59 to 62 may include, wherein the model data is action information describing an action of the user.

In Example 64, the subject matter of any one of Examples 59 to 63 may include, wherein the sensor-based application is a game, and wherein the first and second notifications are inputs that act on an object from the game.

What is claimed is:

1. A central computing device comprising:
one or more computer processors configured to include:
a notification module to:
receive, over a computer network, a first notification from a first computing device, the first notification including data determined from a sensor on the first computing device, the data determined from the sensor indicating information determined about a user associated with a second computing device;
a control module to:
confirm that the second computing device is registered with an augmented reality application; and
a model module to:
calculate an updated model in response to confirming the second computing device is registered using the data determined from the sensor, the updated model describing at least a portion of a real world including a state for the user describing an inferred emotion of the user;
the control module to, in response to confirming that the second computing device is registered:
send a second notification to the second computing device, wherein the second notification includes at least a portion of the updated model describing the state for the user describing the inferred emotion of the user, the second computing device displaying the inferred emotion to the user; and
send a third notification to the first computing device, wherein the third notification includes at least a portion of the updated model.

2. The central computing device of claim 1, wherein the first notification comprises raw sensor data.

3. The central computing device of claim 1, wherein the first notification comprises raw sensor data, and wherein the control module is further configured to determine model data about the user from the raw sensor data.

4. The central computing device of claim 3, wherein the model data includes action information describing an action of the user.

5. The central computing device of claim 1, wherein the first notification comprises action information describing an action of the user.

6. The central computing device of claim 1, wherein the augmented reality application is a game.

7. The central computing device of claim 1, wherein the augmented reality application is an application which displays a state of the user to the user, the state detected by the second computing device.

8. At least one non-transitory machine-readable medium, including instructions, which when performed by a machine cause the machine to perform operations for a collaborative multi-user interaction service, the operations comprising:
receiving, over a computer network, a first notification from a first computing device, the first notification including data determined from a sensor on the first computing device, the data determined from the sensor indicating information about a user associated with a second computing device;
confirming that the second computing device is registered with an augmented reality application; and
responsive to confirming that the second computing device is registered to the augmented reality application:
calculating, using the data determined from the sensor, an updated model, the updated model describing at least a portion of a real world including a state for the user describing an inferred emotion of the user;
sending a second notification to the second computing device, wherein the second notification includes at least a portion of the updated model describing the state for the user describing the inferred emotion of the user, the second computing device displaying the inferred emotion for the user to the user; and
sending a third notification to the first computing device, wherein the third notification includes at least a portion of the updated model.

9. The at least one machine-readable medium of claim 8, wherein the first notification comprises raw sensor.

10. The at least one machine-readable medium of claim 8, wherein the model includes action information describing an action of the user.

11. The at least one machine-readable medium of claim 8, wherein the augmented reality application is a game.

12. The at least one machine-readable medium of claim 8, wherein the augmented reality application is an application which displays an action of the user to the user, the action detected by the second computing device.

13. A computing device participating in a collaborative multi-user interaction service, the computing device comprising:
one or more computer processors configured to include:
a registration module to:
send a registration message to a central computing device, the registration message registering the computing device with the central computing device;
a notification module to:
receive a notification from the central computing device, wherein the notification comprises data determined about a user of the computing device from a forward-facing sensor on a second computing device, the notification includes at least a portion of an updated model calculated by the central computing device and describing a state for the user, the state for the user including an emotion of the user inferred by the central computing device; and
a control module to:
utilize the data determined about the user of the computing device in a sensor-based application coupled to the computing device, by at least displaying an indication of the inferred emotion to the user.

14. The computing device of claim 13, wherein the second computing device is also participating in a same augmented reality.

15. The computing device of claim 14, wherein the includes state information describing a state of the user.

16. The computing device of claim 13, wherein the sensor-based application is a game, and wherein the first and second notifications are inputs that act on an object from the game.

17. At least one non-transitory machine-readable medium, including instructions, which when performed by a machine cause the machine to perform operations for a collaborative multi-user interaction service, the operations comprising:
at a first computing device associated with a user:

sending a registration message to a central computing device, the registration message registering the first computing device with the central computing device;

receiving a notification from the central computing device, wherein the notification comprises data determined about the user from a forward-facing sensor on a second computing device, the notification includes at least a portion of an updated model calculated by the central computing device and describing a state for the user, the state for the user including an emotion of the user inferred by the central computing device; and utilizing the data determined about the user of the computing device in a sensor-based application coupled to the computing device by at least displaying an indication of the inferred emotion to the user.

18. The at least one machine-readable medium of claim 17, wherein the model includes state information describing a state of the user.

19. The at least one machine-readable medium of claim 17, wherein the model includes action information describing an action of the user.

20. The at least one machine-readable medium of claim 17, wherein the sensor-based application is a game, and wherein the first and second notifications are inputs that act on an object from the game.

* * * * *

UNITED STATES PATENT AND TRADEMARK OFFICE
CERTIFICATE OF CORRECTION

PATENT NO. : 9,633,622 B2  
APPLICATION NO. : 14/575797  
DATED : April 25, 2017  
INVENTOR(S) : Kamhi et al.

Page 1 of 1

It is certified that error appears in the above-identified patent and that said Letters Patent is hereby corrected as shown below:

In the Claims

In Column 18, Line 21, in Claim 9, delete "sensor." and insert --sensor data.-- therefor In Column 18, Line 58, in Claim 15, before "includes", insert --model--

In Column 19, Line 14, in Claim 17, delete "device" and insert --device,-- therefor Signed and Sealed this  
Fourth Day of June, 2019

Andrei Iancu  
*Director of the United States Patent and Trademark Office*